United States Patent
Jang (10) Patent No.: US 10,053,625 B2
(45) Date of Patent: *Aug. 21, 2018

(54) DISPLAY DEVICE AND A MANUFACTURING METHOD THEREOF

(71) Applicant: Samsung Display Co., LTD., Yongin-si, Gyeonggi-Do (KR)

(72) Inventor: Hyelim Jang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/932,488

(22) Filed: Nov. 4, 2015

(65) Prior Publication Data
US 2016/0289563 A1    Oct. 6, 2016

(30) Foreign Application Priority Data

Mar. 30, 2015   (KR) .................. 10-2015-0044382

(51) Int. Cl.
*C09K 19/52* (2006.01)
*C09K 19/54* (2006.01)

(52) U.S. Cl.
CPC ............. *C09K 19/52* (2013.01); *C09K 19/54* (2013.01)

(58) Field of Classification Search
CPC ................................ C09K 19/52; C09K 19/54
See application file for complete search history.

(56) References Cited

U.S. PATENT DOCUMENTS

| | | | |
|---|---|---|---|
| 6,444,278 B1* | 9/2002 | Reiffenrath | C07B 63/04 252/299.5 |
| 8,968,842 B2* | 3/2015 | Bae | G02F 1/133788 349/167 |
| 2011/0101270 A1* | 5/2011 | Manabe | C09K 19/32 252/299.62 |
| 2013/0196565 A1* | 8/2013 | Miyake | G02F 1/1337 445/25 |
| 2014/0027671 A1* | 1/2014 | Gotoh | C09K 19/3402 252/299.61 |
| 2015/0152331 A1* | 6/2015 | Kawakami | C09K 19/322 349/42 |
| 2016/0185763 A1* | 6/2016 | Kim | C07D 405/08 349/43 |

FOREIGN PATENT DOCUMENTS

| | | |
|---|---|---|
| JP | 08092258 A | 4/1996 |
| JP | 2010144116 A | 7/2010 |
| KR | 1020130121223 A | 11/2013 |
| KR | 1020140071459 A | 6/2014 |
| KR | 1020140114139 A | 9/2014 |

* cited by examiner

*Primary Examiner* — Chanceity N Robinson
*Assistant Examiner* — Anna Malloy
(74) *Attorney, Agent, or Firm* — Cantor Colburn LLP (57) ABSTRACT

A display device includes a first substrate, a second substrate, and a liquid crystal layer. The second substrate faces the first substrate. The liquid crystal layer is disposed between the first substrate and the second substrate. The liquid crystal layer includes liquid crystal molecules having negative dielectric constant anisotropy and an additive. The additive may be 2,6-di-tert-butyl phenol in which at least one position of a 3-position, 4-position and 5-position is substituted with a substituent.

11 Claims, 5 Drawing Sheets

| Time \ Items | Comparative Example 1 | Example 1 | Example 2 |
|---|---|---|---|
| 0 hr |  | |  |
| 120 hr |  | |  |

DISPLAY DEVICE AND A MANUFACTURING METHOD THEREOF

This application claims priority to Korean Patent Application No. 10-2015-0044382, filed on Mar. 30, 2015, and all the benefits accruing therefrom under 35 U.S.C. § 119, the content of which in its entirety is hereby incorporated by reference.

BACKGROUND

This disclosure relates to a display device and a manufacturing method thereof, and more particularly, to a display device having improved display properties and a manufacturing method thereof.

Recently, various types of display devices have been developed, which may reduce limitations associated with a cathode ray tube, such as the weight and volume of the cathode ray tube. Display devices are used for displaying images on a variety of information processing devices such as televisions, monitors, laptop computers, cellular phones, and the like.

Liquid crystal display devices are flat panel display devices including a liquid crystal layer disposed between two substrates. The liquid crystal display devices include a backlight unit for supplying light. The liquid crystal layer includes liquid crystal molecules.

SUMMARY

This disclosure provides a display device with improved display properties.

This disclosure also provides a method of manufacturing a display device, by which a display device with improved display properties is provided.

An exemplary embodiment of the display device includes a first substrate; a second substrate facing the first substrate; and a liquid crystal layer disposed between the first substrate and the second substrate, where the liquid crystal layer includes liquid crystal molecules having negative dielectric constant anisotropy; and an additive, and where the additive is a 2,6-di-tert-butyl phenol in which at least one position of the 3-position, the 4-position and the 5-position are substituted with a substituent.

In some embodiments, the substituent may be a phenyl, cyclohexyl or cycloamino group.

In one embodiment, the additive may include at least one compound of the following Chemical Formulas 1 and 2:

[Chemical Formula 1]

[Chemical Formula 2]

where, each of $X_1$ and $X_4$ is independently selected from hydrogen, deuterium, and alkyl, alkoxy and cycloamino groups having 1 to 10 carbon atoms, each of $X_2$ and $X_5$ is independently omitted or represents hydrogen, deuterium, or alkyl or alkoxy group having 1 to 5 carbon atoms, each of $X_3$ and $X_6$ is independently omitted or represents hydrogen, deuterium, or alkyl or alkoxy group having 1 to 4 carbon atoms, each of A, B, C and D is independently cyclohexyl or cycloethyl group, and each of k, l, m and n is independently an integer of 0 to 2.

In another embodiment, each of $X_1$ and $X_4$ may be independently selected from compounds of the following Chemical Formula Group 1:

[Chemical Formula Group 1]

In yet another embodiment, each of $X_2$, $X_3$, $X_5$ and $X_6$ may be independently selected from compounds of the following Chemical Formula Group 2:

[Chemical Formula Group 2]

In still yet another embodiment, the additive may be a compound of the following Chemical Formula 3:

[Chemical Formula 3]

In further embodiments, the liquid crystal molecules may include at least one compound of the following Chemical Formula Group 3:

where, each of X and Y is independently selected from hydrogen, deuterium, and alkyl and alkoxy groups having 1 to 5 carbon atoms.

In still another embodiment, the first substrate may include a first base substrate; a common electrode provided on the first base substrate; and a pixel electrode forming an electric field with the common electrode. In another embodiment, the pixel electrode may include a stem portion; and a branch portion which protrudes and extends from the stem portion.

In another embodiment, a method for manufacturing a display device includes preparing a first substrate; disposing a liquid crystal composition on the first substrate; and disposing a second substrate on the liquid crystal composition, where the liquid crystal composition includes liquid crystal molecules having negative dielectric constant anisotropy; and an additive, and where the additive is a 2,6-di-tert-butyl phenol in which at least one position of a 3-position, a 4-position and a 5-position are substituted with a substituent. In an embodiment, the substituent may be a phenyl, cyclohexyl or cycloamino group.

In another embodiment, the additive may include at least one compound of the following Chemical Formulas 1 and 2:

[Chemical Formula 1]

[Chemical Formula 2]

where, each of $X_1$ and $X_4$ is independently selected from hydrogen, deuterium, and alkyl, alkoxy and cycloamino groups having 1 to 10 carbon atoms, each of $X_2$ and $X_5$ is independently omitted or represents hydrogen, deuterium, or alkyl or alkoxy group having 1 to 5 carbon atoms, each of $X_3$ and $X_6$ is independently omitted or represents hydrogen, deuterium, or alkyl or alkoxy group having 1 to 4 carbon atoms, each of A, B, C and D is independently cyclohexyl or cycloethyl group, and each of k, l, m and n is independently an integer of 0 to 2.

In still another embodiment, each of $X_1$ and $X_4$ may be independently selected from compounds of the following Chemical Formula Group 1:

[Chemical Formula Group 1]

In yet another embodiment, each of $X_2$, $X_3$, $X_5$ and $X_6$ may be independently selected from compounds of the following Chemical Formula Group 2:

[Chemical Formula Group 2]

In another embodiment, the additive may be a compound of the following Chemical Formula 3:

[Chemical Formula 3]

In another embodiment, the liquid crystal molecules may include at least one compound of the following Chemical Formula Group 3:

[Chemical Formula Group 3]

where, each of X and Y is independently selected from hydrogen, deuterium, and alkyl and alkoxy groups having 1 to 5 carbon atoms.

In another embodiment, the additive may be present in the liquid crystal composition in an amount of from about 0.03% to about 0.05% by weight, based on 100% by weight of the liquid crystal composition.

In another embodiment, the additive may be present in the liquid crystal composition in an amount of from about 100 to about 1000 parts per million (ppm), based on the a total amount of the liquid crystal composition.

In still another embodiment, the preparing of the first substrate may include preparing a first base substrate; disposing a common electrode on the first base substrate; and disposing a pixel electrode on the first base substrate.

In still yet another embodiment, the disposing of the second substrate on the liquid crystal composition may include preparing a second base substrate; disposing a black matrix on the second base substrate; and disposing a color filter on the second base substrate.

BRIEF DESCRIPTION OF THE DRAWINGS

The above and other aspects, advantages and features of this disclosure will become more apparent by describing in further detail exemplary embodiments thereof with reference to the accompanying drawings, in which.

DETAILED DESCRIPTION

Hereinafter, objects, other objects, features and advantages of the inventive concept will be clarified through the following embodiments related to the accompanying drawings. The inventive concept may, however, be embodied in many different forms and should not be construed as being limited to the embodiments set forth herein. Rather, these embodiments are provided so that this disclosure will be thorough and complete, and will fully convey the scope of the inventive concept to those skilled in the art.

In the drawings, like reference symbols refer to like elements throughout. In the accompanying drawings, the dimensions of structures are exaggerated for clarity of illustration. Terms of "first" or "second" may be used to describe various elements, however, the elements should not be limited to these terms. These terms are used only to differentiate one element from another one. For example, a first element may be named as a second element and vice versa without departing from the scope of the inventive concept. The terms of a singular form may include plural forms unless referred to the contrary.

In the specification, terms such as "include", "including", "comprise" "comprising", "have", or "having" are used to specify the existence of a feature, a number, a step, an operation, an element, a component disclosed herein, or combinations thereof, but should be construed as not excluding the existence or addibility of one or more other features, numbers, steps, operations, elements, components or combinations thereof in advance. It will also be understood that when a layer, a film, a region, or a panel is referred to as being "above" or "on" another element, it can be directly on the other element or intervening elements may also be present. Further, it will be understood that when a layer, a film, a region, or a panel is referred to as being "under" or "below" another element, it can be directly under, and one or more intervening layers may also be present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, a display device according to an exemplary embodiment will be described.

Figure 1:
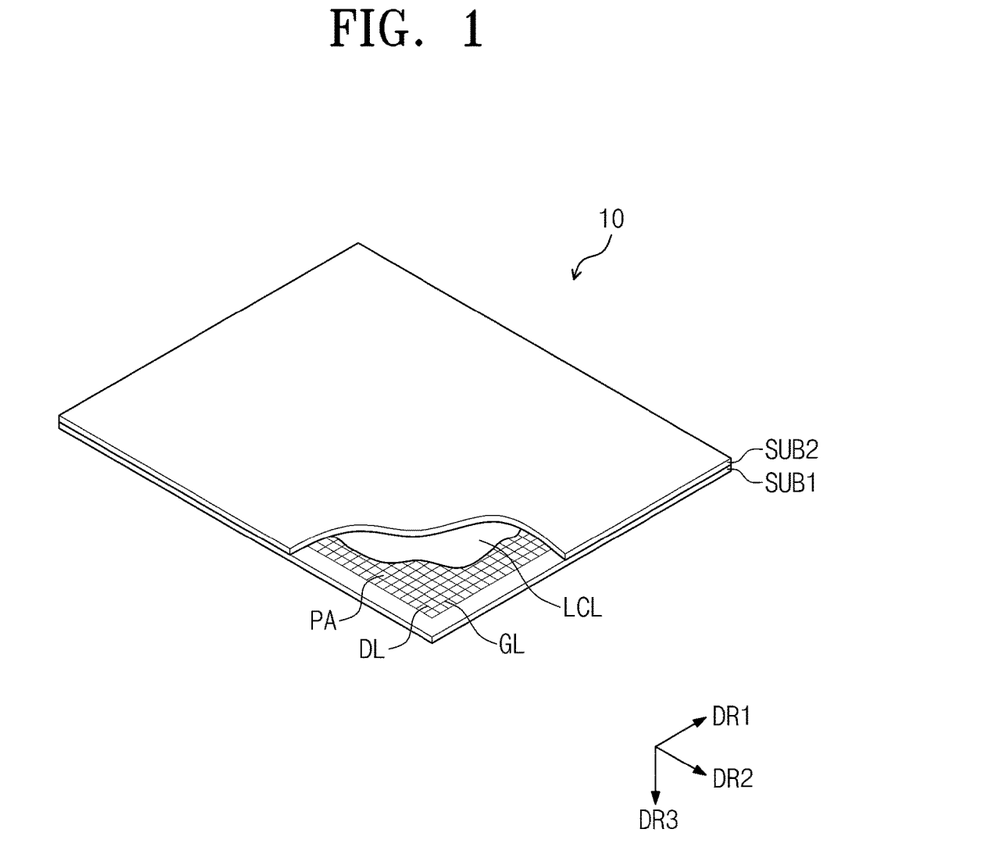
FIG. 1 is a perspective view schematically illustrating an embodiment of a display device.

FIG. 1 is a perspective view schematically illustrating an exemplary embodiment of a display device.

Figure 2:
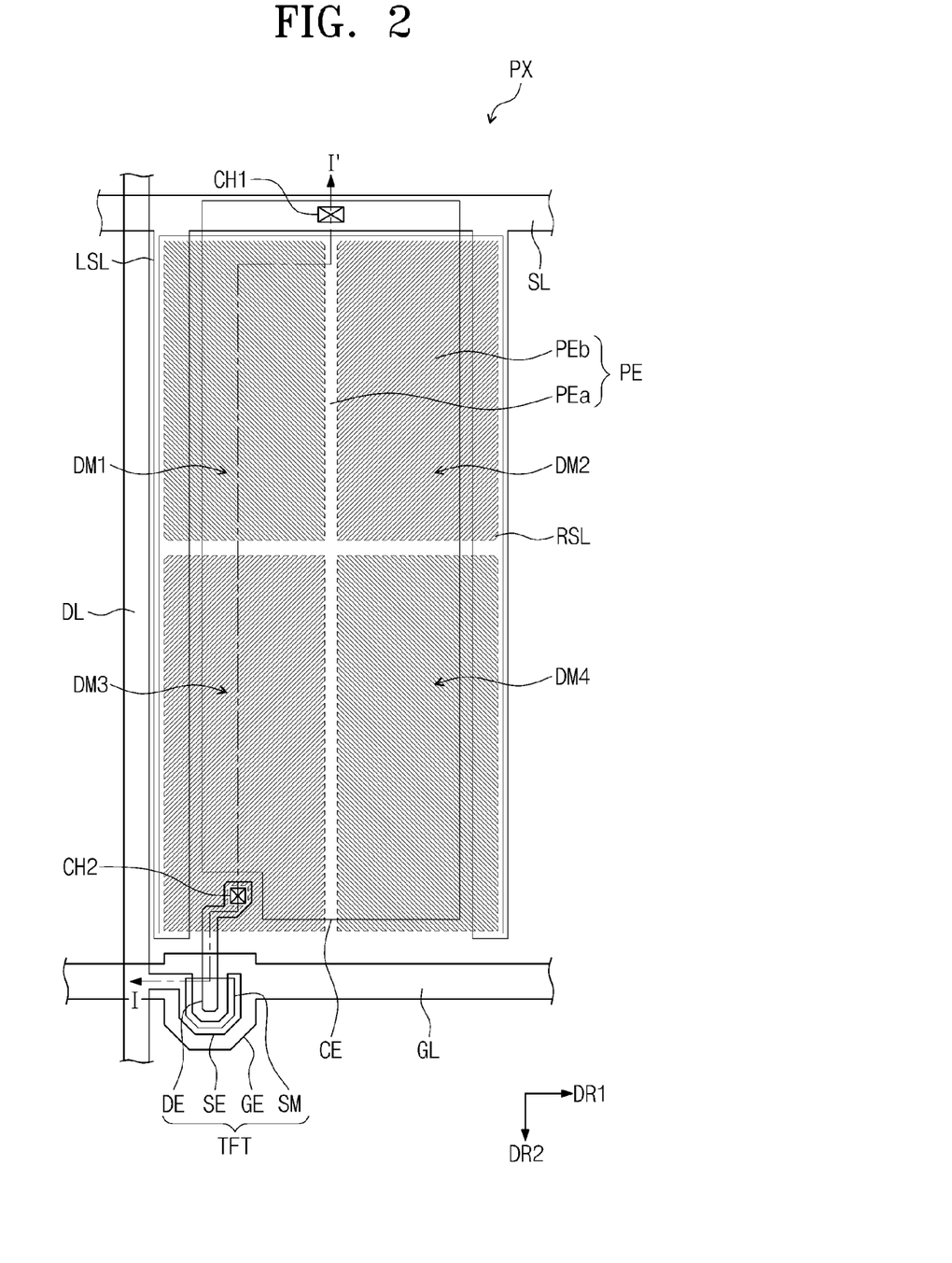
FIG. 2 is a plan view schematically illustrating one pixel included in an embodiment of a display device.

FIG. 2 is a plan view schematically illustrating one pixel included in an embodiment of a display device.

Figure 3:
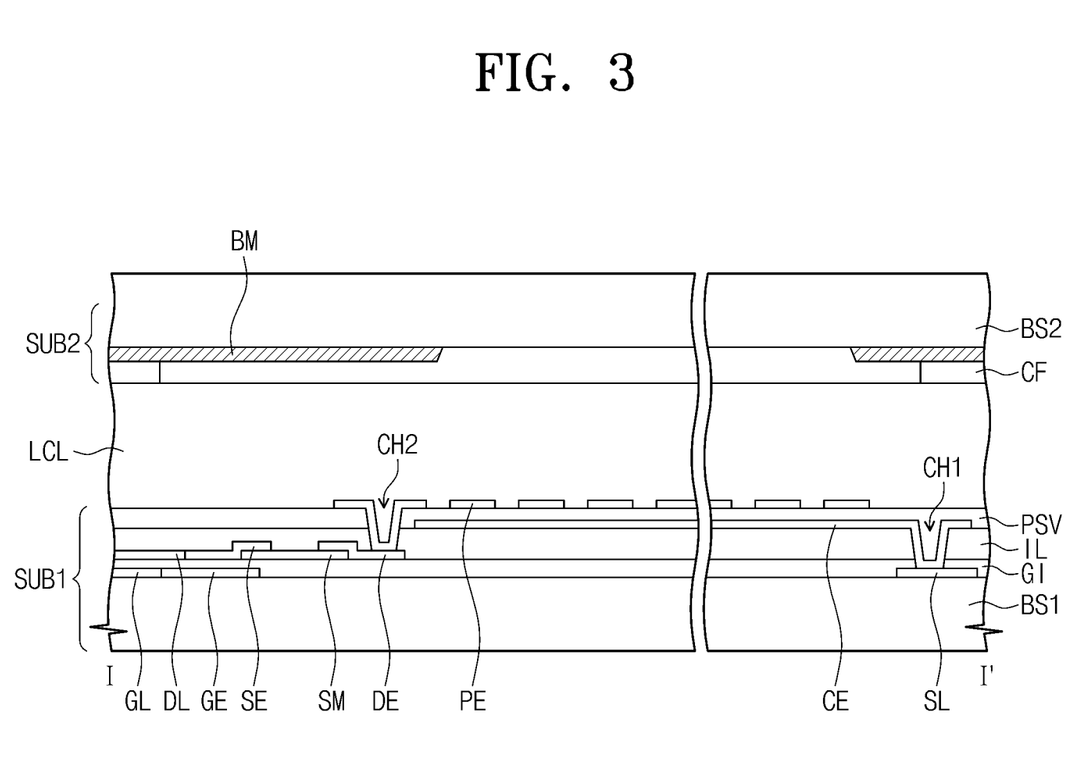
FIG. 3 is a cross-sectional view taken along line IT of FIG. 2.

FIG. 3 is a cross-sectional view taken along line IT of FIG. 2.

Referring to FIGS. 1 to 3, in an exemplary embodiment, the display device 10 includes a first substrate SUB1, a second substrate SUB2 and a liquid crystal layer LCL.

The first substrate SUB1 may include a first base substrate BS1, a plurality of gate lines GL, a plurality of data lines DL, and a plurality of pixel areas PA. In an exemplary embodiment, the pixel areas PA may be defined by the gate lines GL and data lines DL, but the pixel areas PA are not limited thereto. The pixel areas PA may be provided with pixels PX, respectively. In an exemplary pixel area, a pixel area may be provided with a pixel, or may also be provided with a plurality of pixels.

In an embodiment, the display device 10 may have a variety of pixel structures. In an exemplary display device, a pixel may be connected with two gate lines and a data line, or may be connected with a plurality of gate or data lines or a combination thereof. A pixel may have two sub-pixels to which two different voltages are applied. In an exemplary pixel, a high voltage may be applied to one sub-pixel, and a low voltage may be applied to the other sub-pixel.

The first base substrate BS1 may be formed from, but is not particularly limited to, any material conventionally used. In an exemplary embodiment, the first base substrate BS1 may be formed from insulating materials such as glass, plastic, crystal or the like. Furthermore, the first base substrate BS1 may be formed from an organic polymer. Exemplary organic polymers for forming the first base substrate BS1 may be polyethylene terephthalate ("PET"), polyethylene naphthalate ("PEN"), polyimide, polyether sulfone, or the like. The first base substrate BS1 may be selected based on the desired mechanical strength, thermal stability, transparency, surface smoothness, easy handling, and/or waterproofing properties thereof.

The gate lines GL are provided on the first base substrate BS1 such that the gate lines GL extend in the first direction DR1. The data lines DL extend in the second direction DR2 crossing the first direction DR1, with the gate lines GL and a gate insulating layer GI disposed therebetween.

The gate insulating layer GI is disposed on the first base substrate BS1. The gate insulating layer GI covers the gate lines. The gate insulating layer GI may be formed from organic insulating materials and/or inorganic insulating materials. Each of pixels PX includes a thin film transistor TFT, an electrode portion and a storage electrode portion connected to the thin film transistor TFT. The thin film transistor TFT includes a gate electrode GE, a semiconductor pattern SM, a source electrode SE and a drain electrode DE. The electrode portion includes a pixel electrode PE and a common electrode CE which forms an electric field with the pixel electrode PE.

The gate electrode GE is provided on the first base substrate BS1. The gate electrode GE protrudes from the gate lines GL, or is provided on a part of the gate lines GL. The gate electrode GE may be formed from one or more metals. In an exemplary embodiment, the gate electrode GE may be formed from nickel, chrome, molybdenum, aluminum, titanium, copper, tungsten, or an alloy containing at least one of the foregoing metals. The gate electrode GE may be formed as a single layer or a multi-layer.

The semiconductor pattern SM is provided on the gate insulating layer GI. The semiconductor pattern SM is provided on the gate electrode GE with the gate insulating layer GI disposed therebetween. A part of the semiconductor pattern SM overlaps the gate electrode GE. The semiconductor pattern SM includes an active pattern (not shown) provided on the gate insulating layer GI and an ohmic contact layer (not shown) formed on the active pattern. The active pattern may include an amorphous silicon thin film, and the ohmic contact layer may include an $n^+$ amorphous silicon thin film. The ohmic contact layer allows the active pattern to come into ohmic contact with each of the source electrode SE and drain electrode DE. Each of the source electrode SE and drain electrode DE is provided on the gate insulating layer GI. The source electrode SE is branched off from the data lines DL. The source electrode SE is formed on the ohmic contact layer and a portion of the area thereof overlaps the gate electrode GE. The drain electrode DE is spaced apart from the source electrode SE with the semiconductor pattern SM disposed therebetween. The drain electrode DE is formed on the ohmic contact layer and a part of the area thereof overlaps the gate electrode GE. The source electrode SE and the drain electrode DE may be formed of nickel, chrome, molybdenum, aluminum, titanium, copper, tungsten, or an alloy containing at least one of the foregoing metals. The source electrode SE and the drain electrode DE may be formed as a single layer or a multilayer.

On the thin film transistor TFT, an interlayer insulating layer IL is provided. The interlayer insulating layer IL covers the source electrode SE, the drain electrode DE and the gate insulating layer GI. The interlayer insulating layer IL may be formed from organic insulating materials or inorganic insulating materials.

The common electrode CE is provided on the interlayer insulating layer IL. The common electrode CE may receive a common voltage. The common electrode CE may face the pixel electrode PE, and drives the liquid crystal layer LCL by forming an electric field with the pixel electrode PE.

The common electrode CE has roughly a rectangular shape in a plan view, but is not limited thereto, and may thus have various shapes depending on the shape of each pixel. The common electrode CE may be formed as a whole plate without a slit-like pattern inside thereof.

The common electrode CE may be formed of transparent conductive materials. The common electrode may be formed from conductive metal oxides. In an exemplary embodiment, the common electrode may be formed from conductive metal oxides such as indium tin oxide ("ITO"), indium zinc oxide ("IZO"), indium tin zinc oxide ("ITZO") or the like.

Although not illustrated, the storage electrode portion overlaps the pixel electrode PE to form a storage capacitor. The storage electrode portion may be provided on the first base substrate BS1 such that the storage electrode portion extends in the first direction DR1. The storage electrode portion may be provided as being spaced apart from the gate lines GL in a plan view. The storage electrode portion may include a storage line SL extending in the first direction DR1, a first diverging electrode LSL and a second diverging electrode RSL branching off from the storage line SL and extending in the second direction DR2. The storage line SL may be formed from the same materials as the gate lines GL, and may be formed along with the gate lines GL through a single patterning process.

In the gate insulating layer GI and the interlayer insulating layer IL, a first contact hole CH1 may be provided, of which a part is removed to expose a portion of the storage electrode. In an exemplary embodiment, the exposed portion of the storage electrode is a portion of the storage lines SL. The common electrode CE is connected to the storage electrode portion through the first contact hole CH1. Accordingly, a common voltage of the same level is applied to the storage line SL and the common electrode CE. Since the common voltage is applied to the common electrode CE of each pixel PX through the storage line SL, a voltage of constant level is applied to the common electrode CE in the whole display region without voltage drop.

A protective layer PSV is provided on the interlayer insulating layer IL. The protective layer PSV may be formed from organic insulating materials or inorganic insulating materials. The interlayer insulating layer IL and the protective layer PSV may include a second contact hole CH2, which is formed by removing portions thereof. The second contact hole CH2 connects the pixel electrode PE and the drain electrode DE.

The pixel electrode PE is provided on the protective layer PSV. The pixel electrode PE may partially overlap the storage lines SL, the first diverging electrode LSL and the second diverging electrode RSL to form a storage capacitor.

The pixel electrode PE overlaps the common electrode CE at least partially in a plan view, and forms an electric field with the common electrode CE. In an exemplary embodiment, the pixel electrode PE may form a fringe field with the common electrode CE. When a fringe field is formed, liquid crystal molecules rotate on a plane. In addition, liquid crystal molecules having negative dielectric constant anisotropy are polarized in a direction perpendicular to the fringe field. Accordingly, the tilt angle of the liquid crystal molecules is unchanged, and in an exemplary embodiment, the display device 10 may have a wide viewing angle and a high transmittance.

The pixel electrode PE may include a stem portion PEa and a plurality of branch portions PEb which radially protrude and extend from the stem portion PEa. A portion of the stem portion PEa or the branch portions PEb may be connected with the drain electrode DE through the second contact hole CH2.

The stem portion PEa may be provided in a variety of shapes. In an exemplary embodiment, the stem portion PEa may be provided in the shape of cross. Each of the pixels PX may be divided into a plurality of domains by the stem portion PEa. In an exemplary embodiment, each of the pixels PX may include a first domain DM1, a second domain DM2, a third domain DM3 and a fourth domain DM4, which may be divided by the stem portion PEa.

The branch portions PEb correspond to the first domain DM1, the second domain DM2, the third domain DM3 and the fourth domain DM4, respectively, and may extend in different directions within each of the domains. The branch portions PEb are spaced apart from the adjacent branch portions PEb such that they do not to meet with the adjacent branch portions PEb, and extend in the parallel direction each other in the area divided by the stem portion PEa. The adjacent branch portions PEb may be spaced apart from each other by an interval of micrometers, through which the liquid crystal molecules of the liquid crystal layer LCL may be aligned at a specific azimuth angle.

The pixel electrode PE is formed from a transparent conductive material. In an exemplary embodiment, the pixel electrode PE is formed from a transparent conductive oxide. Exemplary transparent conductive oxides are indium tin oxide ("ITO"), indium zinc oxide ("IZO"), indium tin zinc oxide ("ITZO"), etc.

Although in an exemplary embodiment, a structure in which a pixel electrode PE having a plurality of micro-slits and a common electrode CE formed as a whole plate are provided, the embodiments discussed herein are not limited thereto. In an exemplary embodiment, at least one of the pixel electrode PE and common electrode CE may include a domain division means. The domain division means divides each of the pixels PX into a plurality of domains. In an exemplary embodiment, the domain division means may be slits or protuberances.

The second substrate SUB2 is provided on the first substrate SUB1. The second substrate SUB2 faces the first substrate SUB1. The second substrate SUB2 may include a second base substrate BS2, a black matrix BM and a color filter CF. The second base substrate BS2 may have a rectangular shape. The second base substrate BS2 may be formed from, but is not particularly limited to, a material used conventionally. In an exemplary embodiment, insulating materials such as glass, plastic, crystal or the like may be used. Furthermore, the second base substrate BS2 may be formed from an organic polymer. Exemplary organic polymers for forming the second base substrate BS2 may be polyethylene terephthalate ("PET"), polyethylene naphthalate ("PEN"), polyimide, polyether sulfone or the like. The second base substrate BS2 may be selected based on the desired mechanical strength, thermal stability, transparency, surface smoothness, easy handling and/or waterproofing properties thereof.

The black matrix BM is provided on the second base substrate BS2. The black matrix BM may be provided corresponding to a light-shielding region of the first substrate SUB1. The light-shielding region may be defined as a region provided with gate lines GL, data lines DL and a thin-film transistor TFT. Since the pixel electrode PE is not typically formed in the light-shielding region, liquid crystal molecules are not aligned, which may result in light leakage. The black matrix BM is formed in the light-shielding region and may prevent light-leakage. In an exemplary embodiment, while the black matrix BM is shown as being included in the second substrate SUB2, the black matrix is not limited thereto, and therefore the black matrix BM may be included in the first substrate SUB1.

The color filter CF is provided on the second base substrate BS2. The color filter CF provides colors for the liquid crystal layer LCL-transmitted light. The color filter CF may include a red color filter CF, a green color filter CF and a blue color filter CF. The color filter CF may further include a white color filter CF, a cyan color filter CF or a yellow color filter CF.

The liquid crystal layer LCL is provided between the first substrate SUB1 and the second substrate SUB2. The liquid crystal layer LCL includes a plurality of liquid crystal molecules having dielectric constant anisotropy. The liquid crystal molecules may have negative dielectric constant anisotropy. When an electric field is applied between the pixel electrode PE and the common electrode CE, the liquid crystal molecules of the liquid crystal layer LCL rotate in a specific direction between the first substrate SUB1 and the second substrate SUB2, thereby controlling the transmittance of the light entering into the liquid crystal layer LCL. Liquid crystal molecules will be specifically described hereafter.

The liquid crystal layer LCL may further include an additive. The additive may react with radicals or ions resulting from a side reaction in the liquid crystal layer LCL when energy such as ultraviolet light is applied to the liquid crystal layer LCL at the time of driving the display device 10. The additive may react with the radicals or ions to be modified into derivatives thereof.

The additive may be 2,6-di-tert-butyl phenol in which at least one position of the 3-position, 4-position and 5-position are substituted with a substituent. In an exemplary embodiment, the substituent may be a phenyl, cyclohexyl or cycloamino group.

The additive may include at least one compound from the following Chemical Formulas 1 and 2:

[Chemical Formula 1]

[Chemical Formula 2]

In the Chemical Formulas 1 and 2, each of $X_1$ and $X_4$ is independently selected from hydrogen, deuterium, and alkyl, alkoxy and cycloamino groups having 1 to 10 carbon atoms, each of $X_2$ and $X_5$ independently represents a hydrogen, deuterium, or alkyl or alkoxy group having 1 to 5 carbon atoms, each of $X_3$ and $X_6$ independently represents a hydrogen, deuterium, or alkyl or alkoxy group having 1 to 4 carbon atoms, each of A, B, C and D independently represents a cyclohexyl or cycloethyl group, and each of k, l, m and n independently represents an integer of 0 to 2.

Each of $X_1$ and $X_4$ may be independently selected from the compounds from the following Chemical Formula Group 1:

[Chemical Formula Group 1]

Each of $X_2$, $X_3$, $X_5$ and $X_6$ may be independently selected from the compounds from the following Chemical Formula Group 2:

[Chemical Formula Group 2]

The additive may be a compound from the following Chemical Formula 3:

[Chemical Formula 3]

As mentioned above, the liquid crystal molecules may have negative dielectric constant anisotropy. In an exemplary embodiment, the liquid crystal molecules may include liquid crystal molecules of alkenyl groups, alkoxy groups and quarterphenyl groups. The liquid crystal molecules of alkenyl groups and alkoxy groups are relatively low-viscosity liquid crystal molecules in comparison with other liquid crystal molecules, and may thus enhance the response time.

In an exemplary embodiment, the liquid crystal molecules may include at least one compound from the following Chemical Formula Group 3:

[Chemical Formula Group 3]

In the Chemical Formula Group 3, each of X and Y is independently selected from a hydrogen, deuterium, and alkyl and alkoxy groups having 1 to 5 carbon atoms. Conventional display devices in plane to line switching ("PLS") mode generally use liquid crystal molecules having positive dielectric constant ($\Delta\varepsilon$) anisotropy. In the display devices in PLS mode using liquid crystal molecules having positive dielectric constant anisotropy, the liquid crystal molecules become pretilted toward the direction parallel to the electrode, and therefore, the splay angle of the liquid crystal increases at the time of applying the electric field, which results in a decrease in rotational elastic energy.

In an exemplary embodiment, the display device uses liquid crystal molecules having negative dielectric constant anisotropy, which causes the liquid crystal molecules become pretilted toward the direction perpendicular to the electrode, and therefore, the splay angle decreases in comparison with those of positive dielectric constant anisotropy. That is, the liquid crystal layer containing liquid crystal molecules of negative dielectric constant anisotropy may have higher rotational elastic energy in comparison with the liquid crystal layer containing liquid crystal molecules of positive dielectric constant anisotropy. Accordingly, in an exemplary embodiment, the display device may increase the transmittance in the central part of the pixel electrode and common electrode and in the central part of each slit in comparison to the liquid crystal molecules of positive dielectric constant anisotropy.

In addition, in an exemplary embodiment, the display device may decrease the occurrence of afterimage. Afterimage may be formed by the side reaction occurred in the liquid crystal layer when energy such as ultraviolet light is applied to the liquid crystal layer at the time of driving the display device. In an exemplary embodiment, the display device includes an additive, 2,6-di-tert-butyl phenol in which at least one position of the 3-position, 4-position and 5-position is able to react with radicals or ions resulting from the side-reaction, and are substituted with a substituent, thereby preventing the liquid crystal molecules from reacting with the radicals or ions. Accordingly, in an exemplary embodiment, a decrease of voltage holding ratio in pixels may be substantially reduced, effectively minimized and/or effectively prevented, and the defects which may result from the degeneration of liquid crystal molecules, such as stains, line-afterimages and face-afterimages, or the like, may be substantially reduced, effectively minimized and/or substantially or effectively removed. Furthermore, the response time of liquid crystal molecules may be enhanced.

Hereinafter, an exemplary embodiment of the method of manufacturing the display device will be described. Mainly, the differences from the exemplary embodiment of the display device described above will be specifically explained, and the unexplained parts are the same as those illustrated in the exemplary embodiment of the display device described above.

Figure 4:
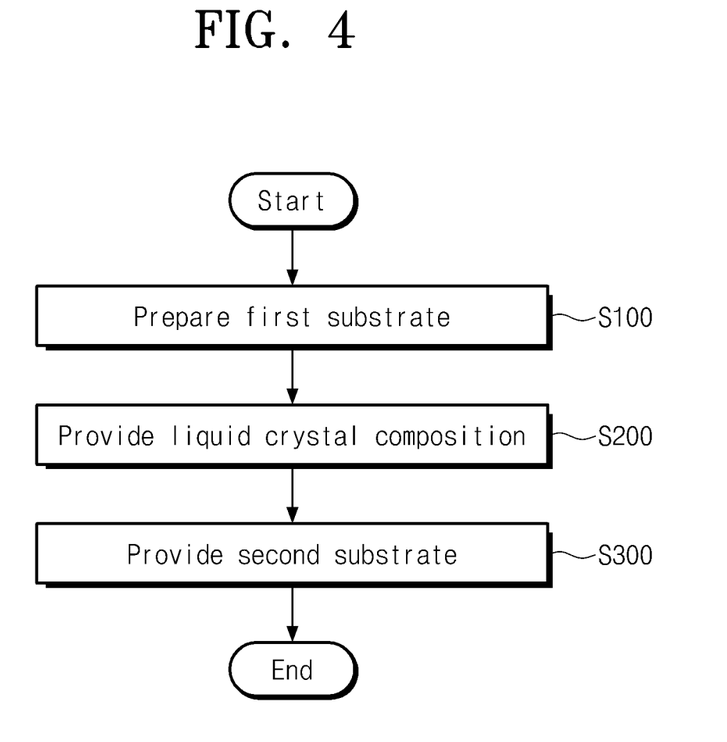
FIG. 4 is a flowchart schematically illustrating an embodiment of a method of manufacturing a display device.

FIG. 4 is a flowchart schematically illustrating a method of manufacturing an exemplary embodiment of a display device.

Referring to FIG. 4, in an exemplary embodiment, the method of manufacturing the display device includes preparing a first substrate S100, disposing a liquid crystal composition on the first substrate S200, and disposing a second substrate on the liquid crystal composition S300.

Referring to FIGS. 1 to 4, the first substrate SUB1 is prepared S100. The preparation of the first substrate SUB1 S100 may include preparing the first base substrate BS1, disposing the common electrode CE on the first base substrate BS1, and disposing the pixel electrode PE on the first base substrate BS1.

In the preparation of the first base substrate BS1, the first base substrate BS1 may be formed from, but is not particularly limited to, conventionally used materials. In an exemplary embodiment, the first base substrate BS1 may be formed from insulating materials such as glass, plastic, crystal, or the like. Furthermore, the first base substrate BS1 may be formed from an organic polymer. An exemplary organic polymer for forming the first base substrate BS1 may be polyethylene terephthalate ("PET"), polyethylene naphthalate ("PEN"), polyimide, polyether sulfone or the like. The first base substrate BS1 may be selected based upon the desired mechanical strength, thermal stability, transparency, surface smoothness, easy handling and/or waterproofing properties thereof.

The common electrode CE is provided on the first base substrate BS1. The common electrode CE may receive a common voltage. The common electrode CE may face the pixel electrode PE, and drives the liquid crystal layer LCL by forming an electric field with the pixel electrode PE.

The common electrode CE may be formed from transparent conductive materials. The common electrode may be formed from conductive metal oxides. In an exemplary embodiment, the common electrode may be formed from conductive metal oxides such as indium tin oxide ("ITO"), indium zinc oxide ("IZO"), indium tin zinc oxide ("ITZO") or the like.

The pixel electrode PE is provided on the first base substrate BS1. The pixel electrode PE overlaps the common electrode CE at least partially in a plan view, and forms an electric field with the common electrode CE. In an exemplary embodiment, the pixel electrode PE may form a fringe field with the common electrode CE. When a fringe field is formed, liquid crystal molecules rotate on a plane. In addition, liquid crystal molecules having negative dielectric constant anisotropy are polarized in a direction perpendicular to the fringe field. Accordingly, the tilt angle of the liquid crystal molecules is unchanged, and in an exemplary embodiment, the display device 10 manufactured by the method of manufacturing the display device may have a wide viewing angle and a high transmittance.

The pixel electrode PE may include a stem portion PEa and a plurality of branch portions PEb which radially protrude and extend from the stem portion PEa. A portion of the stem portion PEa or the branch portions PEb may be connected with the drain electrode DE through the second contact hole CH2.

In an exemplary embodiment, the stem portion PEa may be provided in a variety of shapes in the shape of cross. Each of the pixels PX may be divided into a plurality of domains by the stem portion PEa. In an aspect of the exemplary embodiment, each of the pixels PX may include a first domain DM1, a second domain DM2, a third domain DM3 and a fourth domain DM4, which may be divided by the stem portion PEa.

The branch portions PEb correspond to each of the first domain DM1, the second domain DM2, the third domain DM3 and the fourth domain DM4, respectively, and may extend in different directions within each of the domains. The branch portions PEb are spaced apart from the adjacent branch portions PEb such that they do not meet with the adjacent branch portions PEb, and extend in the parallel direction each other in the area divided by the stem portion PEa. The adjacent branch portions PEb may be spaced apart from each other by an interval of micrometers, through which the liquid crystal molecules of the liquid crystal layer LCL may be aligned at a specific azimuth angle.

The pixel electrode PE is formed from transparent conductive materials. In an exemplary embodiment, the pixel electrode PE is formed from a transparent conductive oxide. Exemplary transparent conductive oxides are indium tin oxide ("ITO"), indium zinc oxide ("IZO"), indium tin zinc oxide ("ITZO") or the like.

The liquid crystal composition is provided on the first substrate SUB1 S200. The preparation of the liquid crystal composition S200 will be specifically described hereafter.

The preparation of the second substrate SUB2, S300 may include preparing the second base substrate BS2, disposing the black matrix BM on the second base substrate BS2, and disposing the color filter CF on the second base substrate BS2.

In the preparation of the second base substrate BS2, the second base substrate BS2 may be formed from, but is not particularly limited to, a conventionally used material. In an exemplary embodiment, the second base substrate BS2 may be formed from insulating materials such as glass, plastic, crystal or the like. Furthermore, the second base substrate BS2 may be formed from an organic polymer. Exemplary organic polymers for forming the second base substrate BS2 may be polyethylene terephthalate ("PET"), polyethylene naphthalate ("PEN"), polyimide, polyether sulfone or the like. The second base substrate BS2 may be selected based upon the desired mechanical strength, thermal stability, transparency, surface smoothness, easy handling, and/or waterproofing properties thereof.

The preparation of the black matrix BM may be performed by forming a light-shielding layer absorbing light, and patterning the light-shielding layer by using photolithography, but is not particularly limited thereto. In an exemplary embodiment, the preparation of the black matrix may thus be performed by using an inkjet method or the like.

The preparation of the color filter CF may be performed by forming a color layer showing red, green, blue or other colors on the second base substrate BS2, and patterning the color layer by using photolithography. However, the preparation of the color filter is not limited thereto. In an exemplary embodiment, the preparation of the color filter may thus be performed by using an inkjet method or the like.

As mentioned above, an exemplary embodiment of the method of manufacturing the display device 10 includes disposing the liquid crystal composition on the first substrate SUB1, S200. In the preparation of the liquid crystal composition S200, the liquid crystal composition may include liquid crystal molecules and an additive. In an exemplary embodiment, the liquid crystal composition may form the liquid crystal layer through the process of annealing.

The additive may react with radicals or ions resulting from the side reaction in the liquid crystal layer LCL when energy such as ultraviolet layer is given to the liquid crystal layer LCL on driving the display device 10. The additive may react with the radicals or ions to be modified into the derivatives of the additive.

The additive may be 2,6-di-tert-butyl phenol in which at least one position of 3-position, 4-position and 5-position are substituted with a substituent. In an exemplary additive, the substituent may be a phenyl, cyclohexyl or cycloamino group.

The additive may include at least one compound from the following Chemical Formulas 1 and 2:

[Chemical Formula 1]

[Chemical Formula 2]

In the Chemical Formulas 1 and 2, each of $X_1$ and $X_4$ is independently selected from hydrogen, deuterium, and alkyl, alkoxy and cycloamino groups having 1 to 10 carbon atoms, each of $X_2$ and $X_5$ independently represents hydrogen, deuterium, or alkyl or alkoxy group having 1 to 5 carbon atoms, each of $X_3$ and $X_6$ independently represents a hydrogen, deuterium, or alkyl or alkoxy group having 1 to 4 carbon atoms, each of A, B, C and D is independently a cyclohexyl or cycloethyl group, and each of k, l, m and n is independently an integer of 0 to 2.

Each of $X_1$ and $X_4$ may be independently selected from compounds from the following Chemical Formula Group 1:

[Chemical Formula Group 1]

Each of $X_2$, $X_3$, $X_5$ and $X_6$ may be independently selected from compounds from the following Chemical Formula Group 2:

[Chemical Formula Group 2]

The additive may be a compound of the following Chemical Formula 3:

[Chemical Formula 3]

In the liquid crystal composition, the additive may be present in an amount of from about 0.03% to about 0.05% by weight, based on 100% by weight of the liquid crystal composition. If the additive is less than 0.03% by weight, the additive may not sufficiently prevent the oxidation of the liquid crystal molecules. In contrast, if the additive is more than 0.05% by weight, the additive may react excessively to precipitate foreign materials.

In the liquid crystal composition, the additive may be present in an amount of from about 100 to about 1000 parts per million (ppm), based on the liquid crystal composition. If the additive is less than 100 ppm, it may not sufficiently prevent the oxidation of the liquid crystal molecules. In contrast, if the additive is more than 1000 ppm, the additive may react excessively to precipitate foreign materials The liquid crystal molecules may have negative dielectric constant anisotropy. In an exemplary embodiment, the liquid crystal molecules may include those of alkenyl groups, alkoxy groups and quarterphenyl groups. The liquid crystal molecules of alkenyl groups and alkoxy groups are relatively low-viscosity liquid crystal molecules in comparison with other liquid crystal molecules, so that the response time may be enhanced.

In an exemplary embodiment, the liquid crystal molecules may include at least one compound from the following Chemical Formula Group 3:

[Chemical Formula Group 3]

In the Chemical Formula Group 3, each of X and Y is independently selected from hydrogen, deuterium, and alkyl and alkoxy groups having 1 to 5 carbon atoms. Conventional display devices of plane to line switching ("PLS") mode generally use liquid crystal molecules having positive dielectric constant ($\Delta\varepsilon$) anisotropy. In the display devices of PLS mode using liquid crystal molecules having positive dielectric constant anisotropy, the liquid crystal molecules become pretilted toward the direction parallel to the electrode, and therefore, the splay angle of the liquid crystal increases at the time of applying the electric field, which decreases rotational elastic energy.

In an exemplary embodiment, the display device uses liquid crystal molecules having negative dielectric constant anisotropy, which causes the liquid crystal molecules to become pretilted toward the direction perpendicular to the electrode, and therefore, the splay angle decreases in comparison with those of positive dielectric constant anisotropy. That is, the liquid crystal layer containing liquid crystal molecules of negative dielectric constant anisotropy may have higher rotational elastic energy in comparison with the liquid crystal layer containing liquid crystal molecules of positive dielectric constant anisotropy. Accordingly, in an exemplary embodiment, the display device manufactured by the method of manufacturing may increase the transmittance in the central part of the pixel electrode and common electrode and in the central part of each slit in comparison with to the liquid crystal molecules of positive dielectric constant anisotropy.

In addition, in an exemplary embodiment, the display device manufactured by the method of manufacturing may reduce the occurrence of afterimage. Afterimage may be formed by the side reaction occurring within the liquid crystal layer when energy such as ultraviolet light is applied to the liquid crystal layer at the time of driving the display device. In an exemplary embodiment, the display device manufactured by the method of manufacturing the display device includes an additive, 2,6-di-tert-butyl phenol, in which at least one position of the 3-position, 4-position and 5-position, is able to react with radicals or ions resulting from the side-reaction, are substituted with a substituent, and therefore, the liquid crystal molecules may be substantially reduced, effectively minimized and/or effectively prevented from reacting with the radicals or ions. Accordingly, in an exemplary embodiment, the decrease of voltage holding ratio in pixels may be substantially reduced, effectively minimized and/or effectively prevented, and the defects which may result from the degeneration of liquid crystal molecules such as stains, line-afterimages and face-afterimages, or the like, may be reduced or removed. Furthermore, the response time of liquid crystal molecules may be enhanced.

Hereinafter, an exemplary embodiment of the liquid crystal display will be described in more detail by the following Examples. However, these Examples are intended to illustrate the liquid crystal display only, and the scope of the liquid crystal display is not limited thereto.

EXAMPLES

Example 1

A liquid crystal layer was formed using the liquid crystal molecules described in the following Table 1, and the additive of the following Chemical Formula 3, the amount of which was 300 parts per million (ppm) based on the liquid crystal molecules. A display device of the structure shown in FIGS. 1 to 3 including the liquid crystal layer was manufactured.

TABLE 1

| Liquid crystal molecules | Weight (%) |
|---|---|
|  | 35 |
|  | 14 |

TABLE 1-continued

| Liquid crystal molecules | Weight (%) |
|---|---|
|  | 9 |
|  | 27 |
|  | 14 |
|  | 1 |

In the above Table 1, each of X and Y is a methyl group. Chemical Formula 3 is provided below:

[Chemical Formula 3]

Example 2

A liquid crystal layer was formed in the same manner as in Example 1, except that the amount of the additive was 500 parts per million (ppm) based on the liquid crystal molecules. Furthermore, a display device including the liquid crystal layer was manufactured in the same manner as in Example 1.

Comparative Example 1

A display device was manufactured in the same manner as in Example 1, except that the additive was not included.

Experimental Result

Face-afterimages were analyzed in the display devices manufactured in Examples 1 and 2 and Comparative Example 1 over time at 0 hours and after 120 hours.

Figure 5:
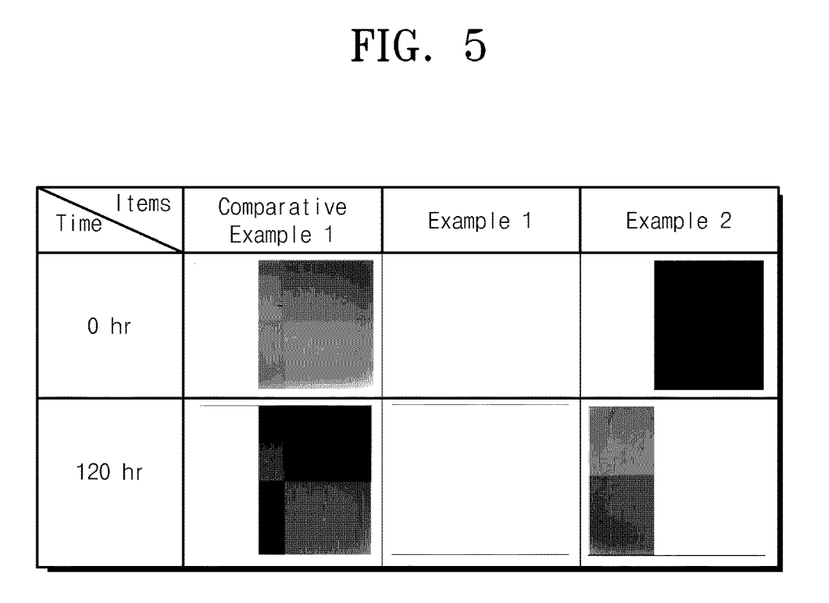
FIG. 5 is a table showing photographs of face-afterimages in Comparative Example 1 and Examples 1 and 2.

Referring to FIG. 5, it is confirmed that face-afterimages in the display devices including the additive as manufactured in Examples 1 and 2 were improved in comparison to the display device manufactured in Comparative Example 1.

In an exemplary embodiment, a display device with improved display quality may be provided.

In an exemplary embodiment, a display device with improved display quality may be manufactured.

Although a preferred embodiment of the inventive concept has been disclosed with reference to the attached drawings, various changes and modifications may be made thereto by one skilled in the art without departing from the scope and spirit of the inventive concept as set forth in the appended claims. It is also understood that the terms used herein are merely descriptive, rather than limiting.

The invention claimed is:

1. A display device comprising:
a first substrate;
a second substrate facing the first substrate; and
a liquid crystal layer provided between the first substrate and the second substrate,
wherein the liquid crystal layer comprises:
liquid crystal molecules having negative dielectric constant anisotropy; and
an additive,
wherein the additive comprises at least one compound from the following Chemical Formulas 1 and 2:

[Chemical Formula 1]

[Chemical Formula 2]

wherein,
each of $X_1$ and $X_4$ is independently selected from compounds of the following Chemical Formula Group 1,

[Chemical Formula Group 1]

wherein each of $X_2$ and $X_5$ independently represents an alkyl having 1 to 5 carbon atoms or ether group, each of $X_3$ and $X_6$ independently represents an alkyl having 1 to 4 carbon atoms or ether group, each of A, B, C and D is independently a cyclohexyl or cycloether group, and each of k, l, m and n is independently an integer of 0 to 2.

2. The display device of claim 1, wherein the additive is a compound of the following Chemical Formula 3

[Chemical Formula 3]

3. The display device of claim 1, wherein the liquid crystal molecules comprise at least one compound from the following Chemical Formula Group 3:

[Chemical Formula Group 3]

wherein,
each of X and Y is independently selected from hydrogen, deuterium, and alkyl and alkoxy groups having 1 to 5 carbon atoms.

4. The display device of claim 1, wherein the first substrate comprises:
a first base substrate;
a common electrode provided on the first base substrate; and
a pixel electrode forming an electric field with the common electrode.

5. A method of manufacturing a display device, the method comprising:
preparing a first substrate;
disposing a liquid crystal composition on the first substrate; and
disposing a second substrate on the liquid crystal composition, wherein the liquid crystal composition comprises:
  liquid crystal molecules having negative dielectric constant anisotropy; and
  an additive,
  wherein the additive comprises at least one compound from the following Chemical Formulas 1 and 2:

[Chemical Formula 1]

[Chemical Formula 2]

wherein,
  each of $X_1$ and $X_4$ is independently selected from compounds of the following Chemical Formula Group 1,

[Chemical Formula Group 1]

wherein each of $X_2$ and $X_5$ independently represents an alkyl having 1 to 5 carbon atoms or ether group, each of $X_3$ and $X_6$ independently represents an alkyl having 1 to 4 carbon atoms or ether group, each of A, B, C and D is independently a cyclohexyl or cycloether group, and each of k, l, m and n is independently an integer of 0 to 2.

6. The display device of claim 5, wherein the pixel electrode comprises
  a stem portion; and
  a branch portion which protrudes and extends from the stem portion.

7. The method of claim 5, wherein the additive is a compound of the following Chemical Formula 3:

[Chemical Formula 3]

8. The method of claim 5, wherein the additive is present in the liquid crystal composition in an amount from 0.03% to 0.05% by weight, based on 100% by weight of the liquid crystal composition.

9. The method of claim 5, wherein the additive is present in the liquid crystal composition in an amount from 100 to 1000 parts per million, based on a total amount of the liquid crystal composition.

10. The method of claim 5, wherein the preparing of the first substrate comprises:
  preparing a first base substrate;
  disposing a common electrode on the first base substrate; and
  disposing a pixel electrode on the first base substrate.

11. The method of claim 5, wherein the disposing the second substrate on the liquid crystal composition comprises:
  preparing a second base substrate;
  disposing a black matrix on the second base substrate; and
  disposing a color filter on the second base substrate.

* * * * *